(12) United States Patent
Moro

(10) Patent No.: US 10,638,840 B2
(45) Date of Patent: May 5, 2020

(54) MOUNTING SYSTEM

(71) Applicant: Harman International Industries, Incorporated, Stamford, CT (US)

(72) Inventor: Jerry Moro, Moorpark, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 66 days.

(21) Appl. No.: 15/595,586

(22) Filed: May 15, 2017

(65) Prior Publication Data
US 2017/0325588 A1    Nov. 16, 2017

Related U.S. Application Data

(60) Provisional application No. 62/337,241, filed on May 16, 2016.

(51) Int. Cl.
| *A47B 96/06* | (2006.01) |
| *A47B 96/07* | (2006.01) |
| *F16B 13/10* | (2006.01) |
| *F16B 1/00* | (2006.01) |
| *F16B 45/00* | (2006.01) |

(52) U.S. Cl.
CPC ............ *A47B 96/061* (2013.01); *A47B 96/06* (2013.01); *A47B 96/07* (2013.01); *F16B 45/00* (2013.01); *F16B 2001/0035* (2013.01); *F16B 2013/105* (2013.01)

(58) Field of Classification Search
CPC ....... A47B 96/061; A47B 96/06; A47B 96/07; F16B 7/00; H04R 1/025

USPC ........ 248/629; 411/552, 553, 559, 349, 337, 411/341; 403/325, 254
See application file for complete search history.

(56) References Cited

U.S. PATENT DOCUMENTS

| 3,169,293 | A | * | 2/1965 | Neuschotz | ............. | F16B 21/04 |
| | | | | | | 411/552 |
| 6,170,685 | B1 | * | 1/2001 | Currier | .................. | H02G 3/121 |
| | | | | | | 220/3.2 |
| 6,588,543 | B1 | * | 7/2003 | Tchilinguirian | ........ | F21V 21/04 |
| | | | | | | 181/150 |
| 6,659,513 | B1 | * | 12/2003 | Ramsauer | ........... | E05B 17/0025 |
| | | | | | | 292/64 |
| 7,587,059 | B2 | * | 9/2009 | Wright | ..................... | H04R 5/02 |
| | | | | | | 181/150 |
| 7,780,135 | B2 | * | 8/2010 | Nelson | ................... | H04R 1/025 |
| | | | | | | 181/150 |
| 8,365,357 | B2 | * | 2/2013 | Huang | ................ | H04M 1/0216 |
| | | | | | | 16/303 |
| 8,567,733 | B2 | * | 10/2013 | Wang | ..................... | F16D 1/112 |
| | | | | | | 248/220.21 |

(Continued)

*Primary Examiner* — Nkeisha Smith
(74) *Attorney, Agent, or Firm* — McCoy Russell LLP

(57) ABSTRACT

Cantilevered retention systems for architectural systems are provided herein. As one example, a cantilevered retention system may include a support structure, a cantilever structure comprising a threaded channel and an L-shaped hook structure, and one or more retention sources configured to bias the cantilever structure to a first position, the cantilever structure being moveable between the first position and a second position via a fastener that traverses the support structure and at least partially traverses the cantilever structure and the one or more retention sources.

17 Claims, 12 Drawing Sheets

(56) References Cited

U.S. PATENT DOCUMENTS

| | | | |
|---|---|---|---|
| 8,672,087 B2* | 3/2014 | Stewart, Jr. | H04R 1/02 |
| | | | 181/148 |
| 8,708,595 B2* | 4/2014 | Tseng | F16B 5/10 |
| | | | 403/349 |
| 9,084,046 B2* | 7/2015 | Ivey | H04R 1/025 |
| 9,366,380 B2* | 6/2016 | Humphreys | F16M 13/02 |
| 9,438,974 B2* | 9/2016 | Marcum | H04R 1/02 |
| 9,479,852 B2* | 10/2016 | Yang | H04R 1/025 |
| 10,171,897 B2* | 1/2019 | Hart | H04R 1/025 |
| 2004/0179710 A1* | 9/2004 | Farinelli, Jr. | H04R 1/025 |
| | | | 381/386 |
| 2007/0121988 A1* | 5/2007 | Merrey | H04R 1/025 |
| | | | 381/386 |
| 2011/0215203 A1* | 9/2011 | Rose | H05K 7/1412 |
| | | | 244/131 |

* cited by examiner

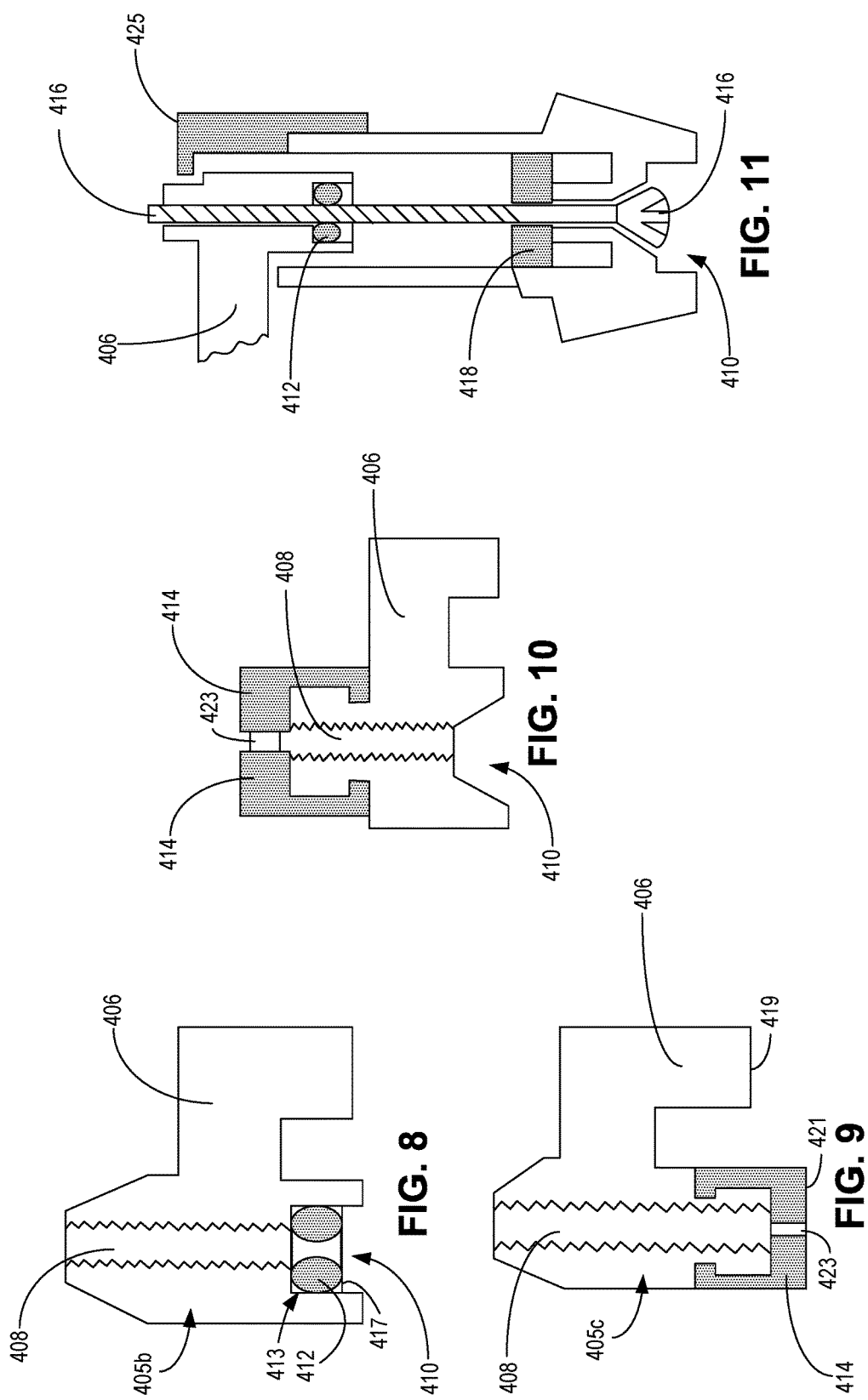

MOUNTING SYSTEM

CROSS REFERENCE TO RELATED APPLICATION

The present application claims priority to U.S. Provisional Application No. 62/337,241, entitled "MOUNTING SYSTEM," filed on May 16, 2016, the entire contents of which are hereby incorporated by reference for all purposes.

FIELD

This application relates to providing cantilevered retention systems for use in mounting operations, including mounting architectural systems such as in-wall retention systems and in-ceiling systems.

BACKGROUND

Installation of speakers into walls or ceiling surfaces presents a number of challenges such as maintaining the strength and overall security of the speaker unit within a wall or ceiling surface when mounted. Ceiling speaker installation may present additional challenges when compared to wall mounting speakers, specifically in that the forces of gravity are constantly pulling the speaker away from the mounting surface in a perpendicular manner. For example, a wall mounted speaker or other device may at least rest against a single face or surface such that the speaker may be supported in at least one region. When mounting speakers or other similar devices in a ceiling however, the device may not be supported by a surface other than its fastening interface.

In order to provide additional support for ceiling or wall mounted devices, a general class of devices called "dog legs" may typically be used. Dog leg mounting or retention systems are configured to clamp, or dog, a peripheral portion of a wall or ceiling surface such as drywall or wood between flanges. Generally, two or more dog legs are mounted peripherally around the speaker or other device such that the device may be secured by the gripping force afforded by the dog legs.

Dog legs are typically positioned within an outer circumference of a hole within a wall or ceiling surface into which the speaker or like device may be inserted. In conventional operation, a screw or similar device is used to rotate or flip the dog legs into a radially aligned position. The screws may then impart a rotation to the dog legs such that the dog legs may be pulled toward an exterior surface of a wall or ceiling mounting surface.

SUMMARY

However, there may be potential drawbacks to existing configurations. Specifically, conventional dog leg style mounting systems for use with in-wall and in-ceiling mounting systems tend to be very loose and may not provide sufficient retention after multiple uses or reconfigurations. For example, testing has shown that once installed and when removed, the level of friction between the dog leg and the screw (e.g., the amount of rotational gripping force between the dog leg and the screw) may be compromised or reduced. Specifically, after several installation and removal cycles, the friction level becomes almost non-existent. When the friction level between the dog leg and the screw is compromised, the dog leg may move around undesirably which may in turn, affect the stability and/or the position of the mounted device.

As one example, once the friction level between the dog legs and the screws are compromised, rotating the screw in order to position the dog leg into a "home" position also referred to herein as an "unlocked" position, may be very difficult. For dog legs that are hanging down in relation to a mounting surface such as a wall, the dog legs may be lifted in order to shift into a home position and the force of gravity and the offset dog leg mass may act to keep the dog leg in a "locked" position wherein the dog leg may protrude outward from the periphery of the mounted device. In the locked position, the removal of the mounted device may be very difficult. In some systems, a "screw to baffle" fitment may be used as a clearance hole, which may be very loose in comparison to simply providing a screw and dog leg assembly. In such systems, the dog leg may fall down into the locked position due to the forces of gravity and/or the offset dog leg mass.

As another example of potential issues drawbacks to current dog leg mounting systems, when removed, the dog leg may be pushed in a direction away from a mounting surface such that the clamping of the mounting surface between the dog leg and the exterior periphery of a mounted device may be negated. In this way, the dog leg may move away from the mounting surface and into a home, unlocked position wherein the dog leg may not protrude outward from the mounted device's periphery. This position may be maintained while a force is applied to the dog leg such as a force of unscrewing the dog leg. However, once the force is no longer present, the dog leg may move out of the home position and may move into a position that may result in complicating the removal of the mounted device. Specifically, in some cases an end user may have to remove architectural components such as a portion of the wall or ceiling in order to remove the mounted device when the dog leg is stuck in a locked position.

In one example, the issues described above may be addressed by providing a cantilevered mounting or retention system in which the position of a cantilever structure may be maintained while installing and/or uninstalling the system. Disclosed herein is a dog leg style mounting system in which an end user may not need to consider the removal of architectural components of the mounting surface resultant from dog leg mounting interference. The ease of re-installation may also be increased due to the fact that the end user may avoid spending additional time re-tightening or resetting all of the dog legs into their unlocked "home" positions before re-installing the system. In one aspect, the dog leg retention systems disclosed herein may exhibit an automatic positioning once the dog leg is unscrewed.

For example, a cantilevered retention system may include a support structure, cantilever structure comprising a threaded channel and an L-shaped hook structure, and one or more retention sources configured to bias the cantilever structure to a first position, the cantilever structure being moveable between the first position and a second position via a fastener that traverses the cylindrical support structure and at least partially traverses the cantilever and the one or more frictional retention sources.

Another example provides a system for mounting architectural components onto a wall or ceiling including a cylindrical support comprising a shelf ramp, a dog leg comprising an L-shaped hook movably coupled to the cylindrical support, a spring disposed within an internal area of the cylindrical support, wherein the spring pushes the dog leg up the cylindrical support and then rotates the dog leg into an unlocked home position, and a fastener positioned within the spring which at least partially traverses the dog leg.

Another example provides an architectural mounting system for mounting components onto a wall or ceiling including a cylindrical support comprising a shelf ramp, a dog leg comprising an L-shaped hook movably coupled to the cylindrical support, wherein the dog leg is configured to move along the shelf ramp of the cylindrical support into a home position, a cap releasably coupled to the cylindrical support, a magnet disposed within an interior area of the cap—which may couple to a magnet (or steel plate) disposed within the dog leg once located into the home position, one or more sources of frictional retention, and a fastener coupling the dog leg to the cylindrical support.

It should be understood that the summary above is provided to introduce in simplified form, a selection of concepts that are further described in the detailed description. The description is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below:

FIG. 8 illustrates a cross-sectional view of a fifth example of a dog leg retention system in accordance with one or more first embodiments of the present disclosure;

FIG. 9 illustrates a cross-sectional view of a sixth example of a dog leg retention system in accordance with one or more first embodiments of the present disclosure;

FIG. 10 illustrates a cross-sectional view of a seventh example of a dog leg retention system in accordance with one or more first embodiments of the present disclosure;

FIG. 11 shows a cross-sectional view of an eighth example of a dog leg retention system in accordance with one or more first embodiments of the present disclosure;

DETAILED DESCRIPTION

The following description relates to systems and devices for mounting and/or retaining architectural components such as wall mounted or ceiling mounted electronics. As one example, a cantilevered retention system may be provided, including a support structure, a cantilever including a threaded channel and an L-shaped hook structure movably coupled to the support structure, one or more retention sources, and a fastener which may traverse the support structure and at least partially traverse the cantilever and the one or more retention sources. In this way, a "home" or unlocked position of the cantilever may be maintained.

Figure 1:
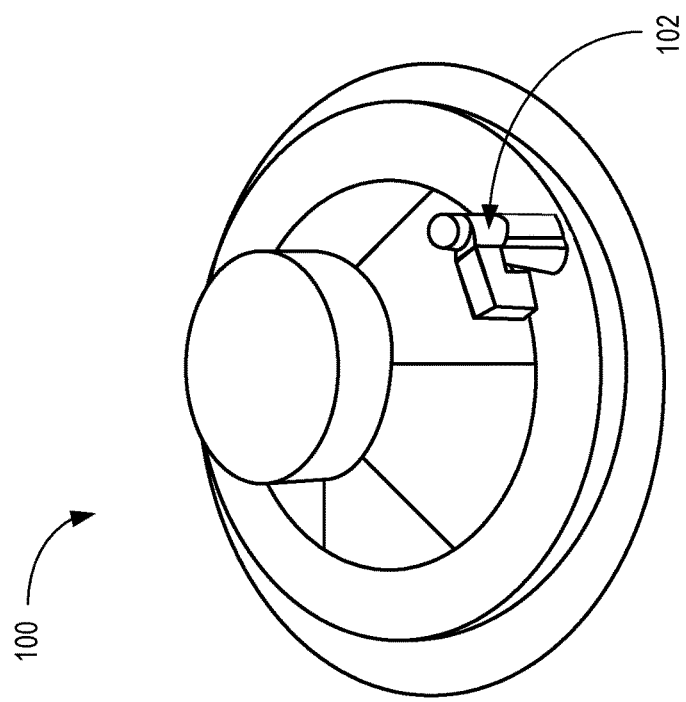
FIG. 1 shows an example speaker device with a cantilever structure in an unlocked position in accordance with one or more embodiments of the present disclosure.

With respect to FIG. 1, this figure illustrates an example architectural system such as a speaker system which may be mounted in a wall, ceiling, or other surface. The example speaker system 100 may comprise a mounting system including a cantilever for retaining the speaker system on the surface. The illustrated example includes a cantilevered mounting system referred to as a "dog leg" mounting system, also referred to herein as a dog leg retention system. For illustrative purposes, the below examples may refer to the cantilever as a dog leg, however it is to be understood that any cantilevered structure may be provided to provide the structure and/or perform the method associated with the example dog legs described herein. As briefly discussed above, the speaker system 100 (also referred to herein as the dog leg mounting system) may comprise a cylindrical support structure which may project outward from a planar interior surface of the example speaker system such that when inserted into a void or hole of wall or ceiling surface, the mount may be fully enclosed and may not be visible from an exterior perspective.

It will be appreciated that as used herein, the term "interior" when used to describe a surface of an example architectural system such as a speaker system, may refer to an area or region that may be disposed within a wall or ceiling surface such that the interior surface is retained fully within the wall or ceiling surface. Likewise, the term "exterior" when used to describe a surface of an example architectural system such as a speaker system, may refer to an area or region which may be visible when viewing the architectural system in a complete and fully installed state. For example, when mounting a speaker into a wall, the exterior surface may comprise a substantially planar surface which may cover a hole into which the other components of the system, disposed on an opposing face of the substantially planar surface, may be retained within. In this way, the quality of sound of a speaker system for example, may not be compromised due to reduced size. For example, the system to be mounted on a wall or ceiling surface may comprise an overall thickness which may be greater than that of a thickness which may be observable when in a fully installed state.

In FIG. 1, the dog leg mounting system 100 is illustrated in an "unlocked" position 102. In this unlocked position, also referred to herein as "home position" or "home base," the dog leg may be positioned such that insertion of the architectural system may not be impaired or inhibited. The dog leg mounting system may comprise an L-shaped hook type structure which may rest atop a hollow cylindrical support structure. The L-shaped hook structure, hereinafter referred to as the dog leg, may be rotatably mounted atop the cylindrical support structure such that the dog leg may rotate along a vertical axis as defined by the cylindrical support. The dog leg mounting system may further comprise a screw disposed within the cylindrical support which may fully traverse an exterior surface and an interior surface of the example architectural system. Components of example dog leg mounting systems will be described in more detail below, with respect to FIGS. 3-21, which show additional views of example dog legs. The screw, in at least one exemplary embodiment, may be adjustable from an exterior surface of the architectural system via turning or rotating said screw with a screwdriver for example. The screw may further serve to provide rotational motion to the dog leg such that when adjusted via a screwdriver or other suitable adjustment mechanism, the dog leg may rotate from a home unlocked position 102 to a "locked" position 202 as illustrated in FIG. 2.

Figure 2:
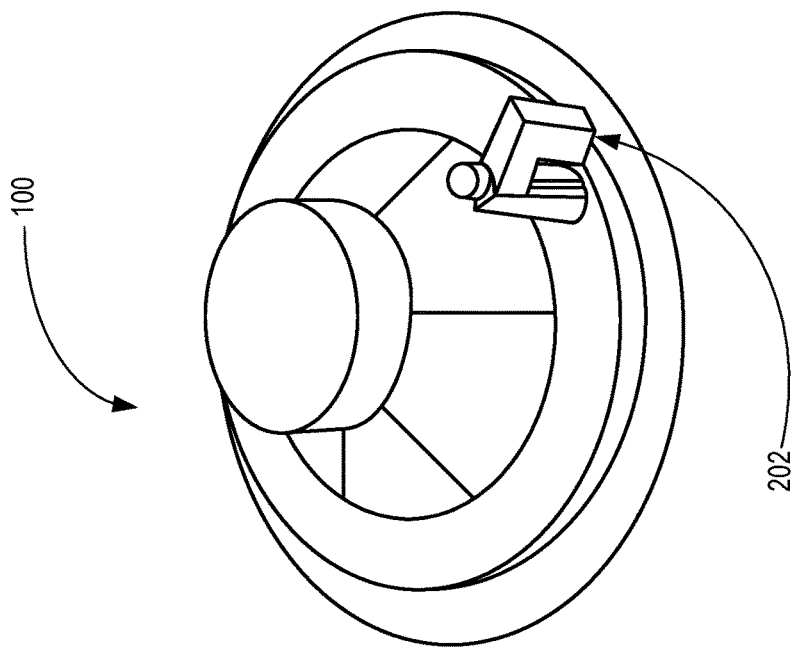
FIG. 2 shows an example speaker device with a cantilever structure in a locked position in accordance with one or more embodiments of the present disclosure.

In FIG. 2, the dog leg mounting system 100 is shown in a locked position wherein the example architecture system may be retained within a wall or ceiling surface via a pinching force exerted by the dog leg in a locked position onto a wall or ceiling surface. For example, when mounting an architectural system onto a wall surface, a hole slightly smaller than the external periphery of the system may be cut into the surface such that the system may not fully traverse the wall surface. In this way, an external periphery of the exemplary architecture system may rest flush against the wall and further, may be in direct face-sharing contact with the wall surface. When the screw is manipulated or adjusted, the dog leg may then rotate into a locked position wherein the dog leg is in direct face-sharing contact with an internal surface of the wall and wherein the architectural system may be effectively retained by the pinching force exerted by the dog leg onto the wall surface.

Figure 3:
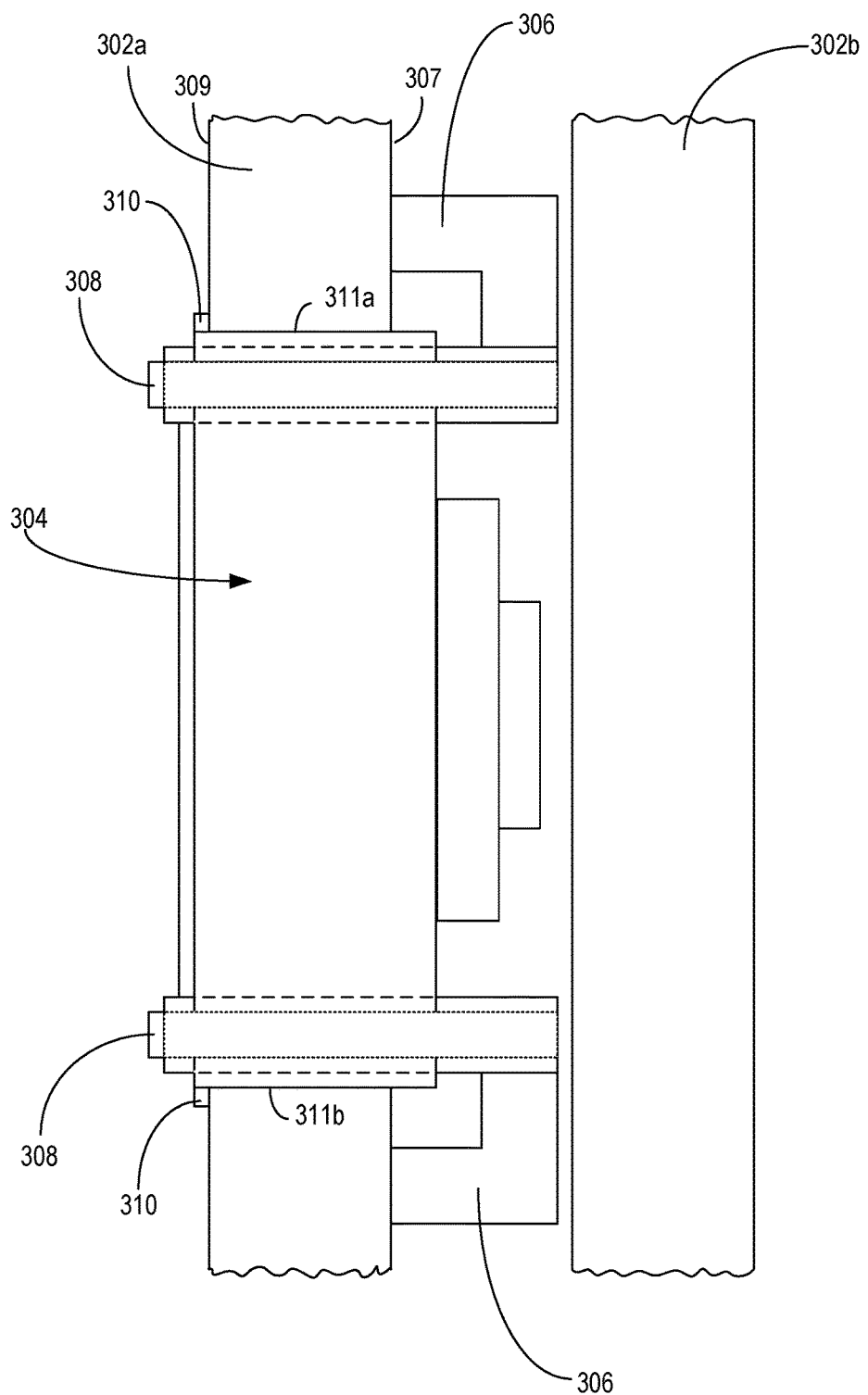
FIG. 3 illustrates an example wall mounted system comprising a plurality of cantilevered structures securing the system to a wall surface in accordance with one or more embodiments of the present disclosure.

As one example of an installation process, FIG. 3 shows a cutaway view of a speaker system 304 mounted on a vertical wall 302a. For example, the vertical wall 302a may correspond to a first side of a partition (e.g., a first sheet of drywall) while a vertical wall 302b may correspond to a second side of the partition (e.g., a second sheet of drywall, where structural components such as insulating material, support beams, air gaps, and/or other material may be disposed in between the two sides of the partition). In this view, an L-shaped dog leg 306 may be in direct face-sharing contact with an interior surface 307 of the wall 302a.

L-shaped dog leg 306 may be a component of a dog leg mounting system, such as dog leg mounting system 100 described above with respect to FIGS. 1 and 2. As briefly described above, the dog leg mounting system may comprise a screw 308 which may fully traverse all surfaces of the example speaker system 304. For example, the screw 308 may pass through a first surface of the example speaker system 304 (e.g., a surface facing away from/opposite of an exterior surface 309 of the wall 302a) and through interior components of the example speaker system to a second surface, opposite the first surface of the example speaker system (e.g., a surface facing away from interior surface 307 of wall 302a and toward wall 302b). In this view, an external periphery 310 may extend beyond the diameter of a hole cut into the wall (e.g., the hole having a diameter extending from 311a to 311b) into which the speaker system 304 may be inserted. For example, the external periphery 310 may form an integrated flange of the speaker system 304 configured to prevent the speaker system from passing all of the way through the hole in the wall 302a. In this way, when the dog legs 306 are in a locked position, the speaker system may be retained within the wall on two faces. For example, the external periphery 310 of the example speaker system may be in direct face-sharing contact with the external planar surface 309 of the wall 302a, and the L-shaped dog leg(s) 306 may each be in direct face sharing contact with the interior planar surface 307 of the wall 302a.

Turning now to FIGS. 4-11, these figures illustrate cross-sectional side profile view of structures providing various examples of a first exemplary embodiment of a dog leg retention system. In this first exemplary embodiment, the retention system may utilize frictional forces in order to retain a screw within the dog leg such that the rotational position of the dog leg may be maintained. In this way, upon removal of the system for example, the dog leg may maintain an unlocked position and the system may be removed from the mounting surface without having to repeatedly adjust the dog leg or, in a worst case, introduce more holes into the surface or otherwise break the surface to remove the system.

Figure 4:
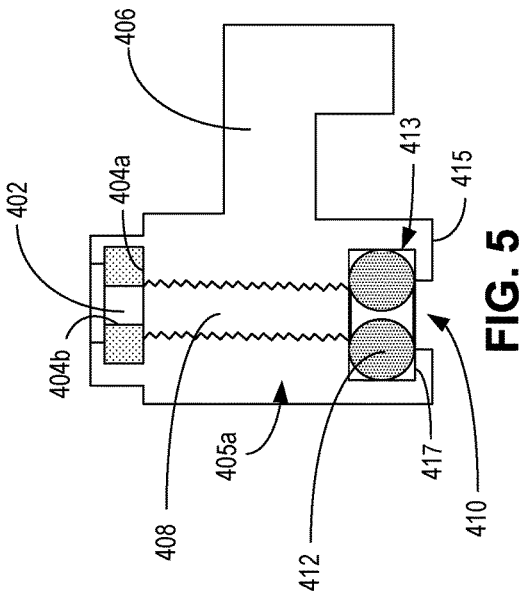
FIG. 4 illustrates a cross-sectional view of a first example of a dog leg retention system in accordance with one or more first embodiments of the present disclosure.

One example of the first embodiment of a dog leg retention system which may utilize frictional force to retain the dog leg position is illustrated in FIG. 4. In this figure, a cross-sectional side profile view is presented to illustrate the internal workings of the device. As briefly noted above, the dog leg retention system, also referred to herein as a dog leg mounting system, may comprise a vertical cylindrical support structure 405a which may include and/or be integrated with an L-shaped protrusion also referred to as a dog leg 406. Although illustrated as a cylindrical support structure, it is to be understood that additional or alternatively-shaped/sized support structures may be provided for supporting the dog leg and associated mounting/retention system. The dog leg may be shaped such that a bottom planar face of the protrusion may extend at least some degree of length shorter than the cylindrical support. For example, when resting on a flat planar surface, a bottom surface of the cylindrical support section may contact the flat planar surface on which the cylindrical support section rests in a direct face-sharing manner, whereas the dog leg may not directly contact the planar surface.

In a non-limiting example, a nylon washer 402 may be disposed along a top ridge of the cylindrical section such that nylon edges 404a of the nylon washer 402 (e.g., a bottom surface of the washer) may be in face-sharing contact with a threaded channel 408 (e.g., with a top of the threaded channel 408). For example, the nylon washer 402 may be disposed in a top groove 409 formed in the top ridge of the cylindrical section 405a. In the illustrated example, the top groove 409 is positioned between the threaded channel 408 and a topmost surface 411 of the cylindrical section 405a (e.g., where the cylindrical section 405a extends above the top groove 409). The top groove 409 may be sized and/or shaped to fit the nylon washer 402 in some examples. For example, the top groove 409 may have a diameter and/or width that is substantially equal to or larger than the diameter/width of the nylon washer 402. The threaded channel 408 may allow for a screw or other similar fastening device to be inserted into the channel and to be selectively and adjustably retained within an interior of the retention system. For example, a screw may be inserted through a bottom hole 410 and may traverse at least a portion of the threaded channel 408. Once partially retained by the threaded channel 408, a screw may then extend through the nylon washer 402 such that nylon edges 404b (e.g., a circumferential surface of an interior hole in the washer 402) may be in direct face-sharing contact with the screw. In this way, the screw may be retained by two different sources of frictional retention force (e.g., the threading of the threaded channel 408 and the nylon washer 402).

Figure 5:
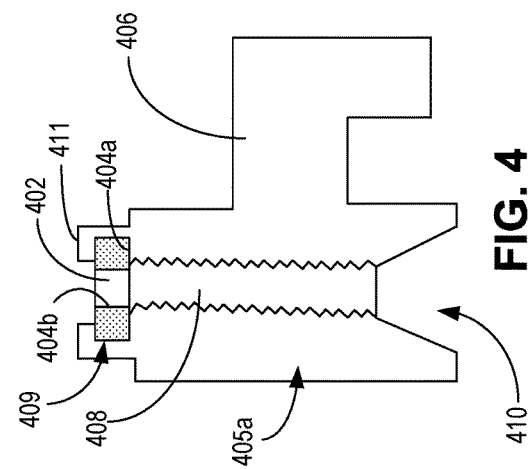
FIG. 5 illustrates a cross-sectional view of a second example of a dog leg retention system in accordance with one or more first embodiments of the present disclosure.

FIG. 5 illustrates another example of an embodiment of a dog leg retention system utilizing frictional force to retain a position of the dog leg. As shown in this figure, the nylon washer 402 may be disposed along a top ridge of the cylindrical support section 405a of the system similarly to the example provided in FIG. 4. Additionally, one or more rubber O-rings or grommets 412 may be disposed along a bottom interior groove 413 of the cylindrical section. In the illustrated example, the bottom interior groove 413 is positioned between the threaded channel 408 and a bottommost surface 415 of the cylindrical section 405a (e.g., where the cylindrical section 405a extends below the bottom interior groove 413). The bottom interior groove may be sized and/or shaped to fit the one or more rubber O-rings or grommets 412. For example, the bottom interior groove 413 may have a diameter or width that is substantially equal to or larger than the diameter/width of the one or more rubber O-rings or grommets 412. In providing one or more rubber O-rings or grommets 412 in a bottom groove in combination with a nylon washer disposed along an upper groove of the cylinder, an added point of contact and therefore frictional retention may be added (e.g., three primary sources of frictional retention forces may be supplied—from the nylon washer 402, the O-rings/grommets 412, and the threads of the threaded channel 408). For example, a screw may be inserted through the bottom hole 410, may traverse the one or more rubber O-rings or grommets 412, and extend through the threaded channel 408, and may at least partially traverse the nylon washer 402. The nylon edges 404b of the nylon washer 402 may serve as a terminal source of frictional retention forces provided by the dog leg system assembly. Although referred to as rubber O-rings or grommets, additional or alternative retaining material may be inserted along the bottom of the threaded channel 408, the top of the threaded channel 408, and/or anywhere along the length of the threaded channel 408 in order to provide frictional retention forces to hold the screw in place in any of the disclosed examples.

Figure 6:
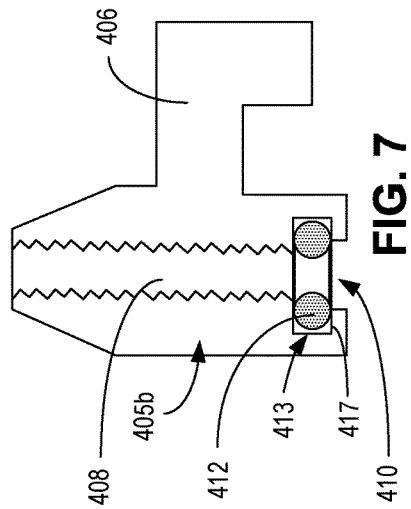
FIG. 6 illustrates a cross-sectional view of a third example of a dog leg retention system in accordance with one or more first embodiments of the present disclosure.

As illustrated in FIG. 6, a further example of the first dog leg retention system embodiment may comprise the nylon washer 402 disposed along the bottom groove 413 which may be disposed above the bottom hole 410 through which a screw or other fastening device may be inserted. In this example, two primary sources of frictional retention forces may be supplied (e.g., the threads of the threaded channel 408 and the nylon washer 402). For example, a screw may be inserted into bottom hole 410, and may fully traverse the nylon washer 402 disposed in the bottom groove 413. The screw or other fastening device may then pass through and at least partially traverse the threaded channel 408 such that motion of the dog leg may be established.

In at least one embodiment, an example dog leg retention system may include a cylindrical support structure 405b, which may be similar to the cylindrical support structure 405a of FIGS. 4 and 5, and may comprise a substantially cylindrical shape wherein a top portion may further comprise a cone shape. This cone shaped cylinder may serve to provide a dog leg retention system in architectural systems which may comprise a limited space or a non-standard shape or configuration. For example, the exemplary embodiments illustrated in FIGS. 6-9 are shown comprising the substantially cylindrical cone shape as described above. It will be appreciated that although described primarily as being constructed from nylon, or rubber, the washers, O-rings, and/or grommets may be constructed from other suitable materials so long as the frictional retention forces of the dog leg retention system may be maintained.

Figure 7:
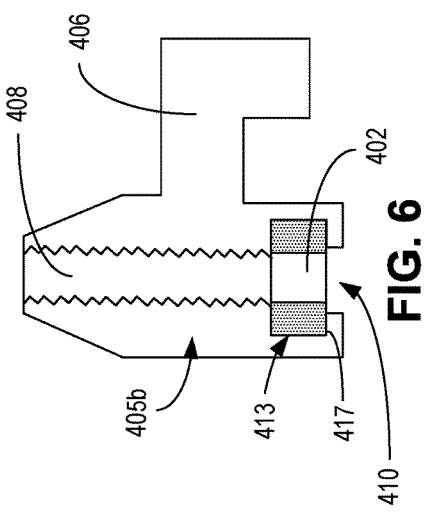
FIG. 7 illustrates a cross-sectional view of a fourth example of a dog leg retention system in accordance with one or more first embodiments of the present disclosure.

Similarly to FIG. 6, the example embodiment illustrated in FIG. 7 may comprise a substantially cylindrical support structure 405b, which may comprise a cone-shaped protrusion at a top end along an axis defined by the threaded channel 408. In this non-limiting example, one or more grommets 412 may be provided and may be disposed along a bottom groove 413 of the cylindrical support 405b. The examples of FIGS. 5-7 include the bottom groove 413 having a bottom edge 417 that is at least partially in face-sharing contact with (and/or be formed by) a leg of the respective cylindrical support structure 405a/b. In this way, the diameter of the bottom grove 413 of FIGS. 5-7 is larger than the diameter of the bottom hole 410. The grommets 412 positioned along a bottom surface of the dog leg system may serve as an initial point of contact and frictional retention for a screw within the dog leg retention system. In this way, a retention or mounting system including at least two points of contact and friction may be provided.

In FIG. 8, a further example of the first embodiment of a dog leg retention system utilizing frictional forces to retain a position of the dog leg is shown. In this example, one or more (e.g., a plurality of) grommets 412 may be disposed within a bottom hole 410 of the cylindrical support. The grommet(s) may provide an initial point of contact for a fastening device such as a screw prior to the screw making contact with the threaded channel 408. In this way, the position of a dog leg may be maintained with little effort resultant from a minor rotation of a screw. For example, when positioning the dog leg for installation, a screw may be inserted into the bottom hole 410 such that the screw may make contact with the one or more grommets 412. The screw may then be rotated to a small degree such that the dog leg may move into an unlocked position. Once the desired position is achieved, the position may then be maintained via frictional forces exerted by the grommet(s) 412 onto the spring. In this way, an end user may no longer need to continuously reposition the dog leg prior to installation and/or removal of the architectural system. The configuration illustrated in FIG. 8 differs from that of FIG. 7 in that the bottom groove 413 is provided in the bottom hole 410 such that a bottom edge 417 of the bottom groove 413 is open to the bottom hole 410 and is not in face-sharing contact with a leg of the cylindrical support structure 405b. In this way, the diameter of the bottom grove 413 is substantially equal to the diameter of the bottom hole 410.

Alternative methods for providing further points of contact and therefore additional points of frictional retention are provided. Specifically, FIG. 9 illustrates an example comprising a cap structure 414 which may comprise rubber, nylon, or other similar construction materials. In this example, the cap structure 414 (also referred to herein as a cap) may be placed onto a bottom edge of the dog leg retention system and may be in direct face-sharing contact with a cylindrical support structure 405c. For example, the cap 414 may include resilient materials enabling the cap to be pushed onto a receiving structure of the cylindrical support structure. It will be appreciated that the cap 414 may be positioned such that the extension of the cap is flush with the periphery of the cylindrical support (e.g., where the width/diameter of the cap is substantially equal to the width/diameter of the cylindrical support structure at a location above the cap). An outer periphery of the cylindrical support structure may be in face-sharing contact with an inner surface of the cap, and may include indentions or protrusions configured to secure the cap to the end of the cylindrical support structure. In this way, a bottom surface 419 of the dog leg 406 may be positioned at a specific distance relative to a bottom surface 421 of the cap 414 of the cylindrical support such that a gripping force between the dog leg and a wall or ceiling interior surface may be established.

In one example, the cap structure may be co-molded with the dog leg retention system and may comprise the same construction materials as the dog leg retention system (e.g., the cylindrical support structure 405c and/or the dog leg 406). For example, in at least one embodiment, a dog leg retention system may be constructed from Acrylonitrile butadiene styrene (ABS) plastic and the cap structure 414 as illustrated in FIG. 9 may be formed integrally with the dog leg retention system such that the cap structure also comprises ABS plastic. The cap 414 may include an opening 423. In some examples, the opening 423 may be adapted (e.g., have flexibility to expand/contract temporarily to a size of the threaded channel 408) to allow an installation mechanism, such as a screw, to pass through and be retained by the cap. In other examples, the opening 423 may be adapted to (e.g., be rigid or not be expandable to a diameter equal to or larger than the threaded channel) prevent the screw from exiting or otherwise passing through the cap. In such examples, the cap 414 may exert a retaining force on the screw, either via the opening 423 or via a threaded channel-facing surface against which the screw may abut.

FIG. 10 illustrates a further example embodiment of a dog leg retention system utilizing frictional retention forces. Similarly to FIG. 9, the cap 414 may be provided which may comprise a rubber, nylon, or other suitable material and may be configured to retain a screw or other similar fastening device through frictional forces. In at least one example, the cap 414 may be provided along a top surface of the dog leg retention system. In this way, a dog let retention system may be provided in which two points of contact and sources of frictional retention may be included. For example, a screw may be inserted through a bottom hole 410 of the system and may traverse the threaded channel 408. The screw may then extend at least partially into the cap 414 such that the screw may be in direct face-sharing contact with the walls of the threaded channel 408, and the interior walls of the cap 414. In this way, the position of the dog leg may be selectively maintained depending on the application.

In FIG. 11, a cross-sectional view of an example dog leg retention system is illustrated. As one example, a top cap 425, one or more bottom friction components 418, and one or more grommets 412 may be provided to impart frictional forces onto a screw 416. In this example, the dog leg retention system may not comprise a threaded channel (e.g., the screw 416 may pass through a smooth channel without threads) and instead, the sources of frictional retention may be the grommets 412, the top cap 425 and the one or more bottom friction components 418. It will be appreciated that the one or more bottom friction components may comprise a nylon or rubber washer, nylon or rubber O-rings or grommets, and/or other suitable materials for frictionally retaining a screw, as well as combinations thereof.

Figure 12:
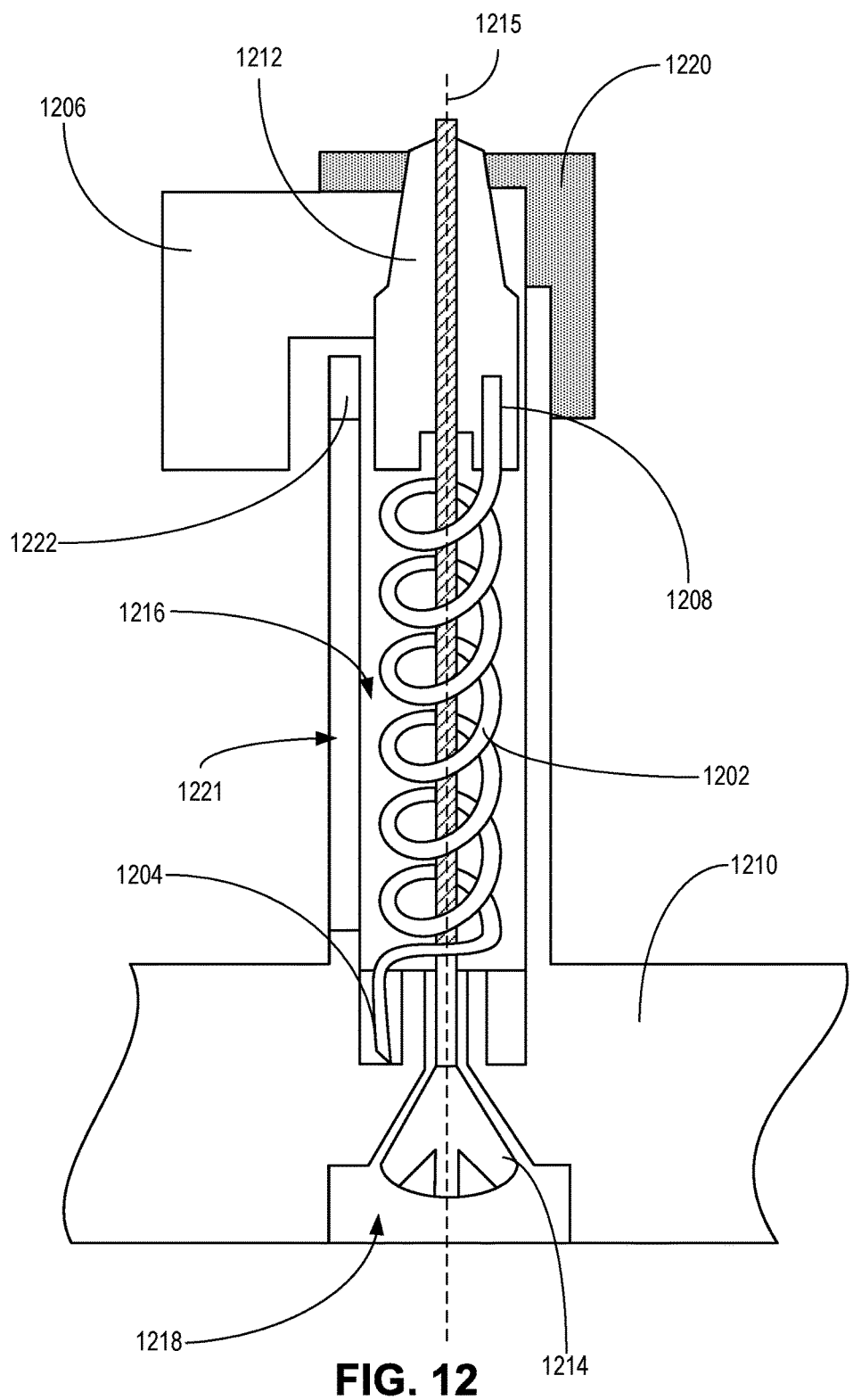
FIG. 12 shows a cross-sectional view of a first example of a dog leg retention system in accordance with one or more second embodiments of the present disclosure.
Figure 14:
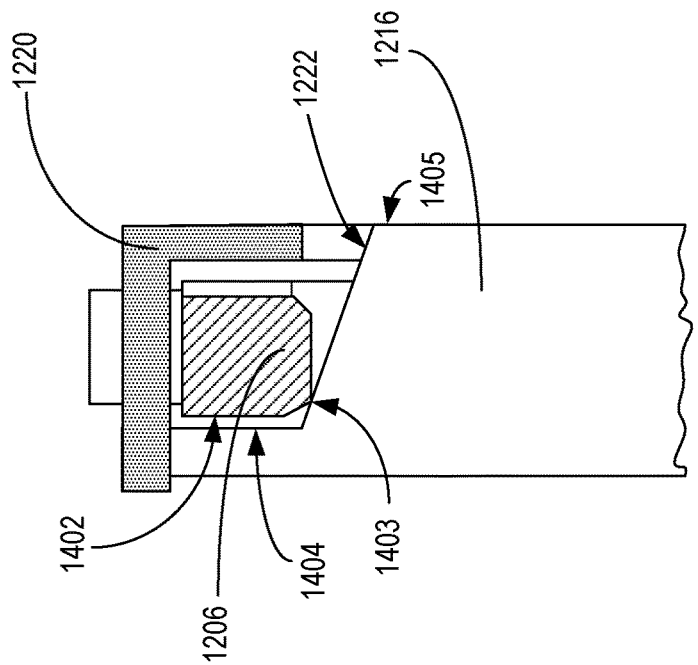
FIG. 14 shows a partial cross-sectional side profile view of the first example of a dog leg retention system in accordance with one or more second embodiments of the present disclosure.
Figure 13:
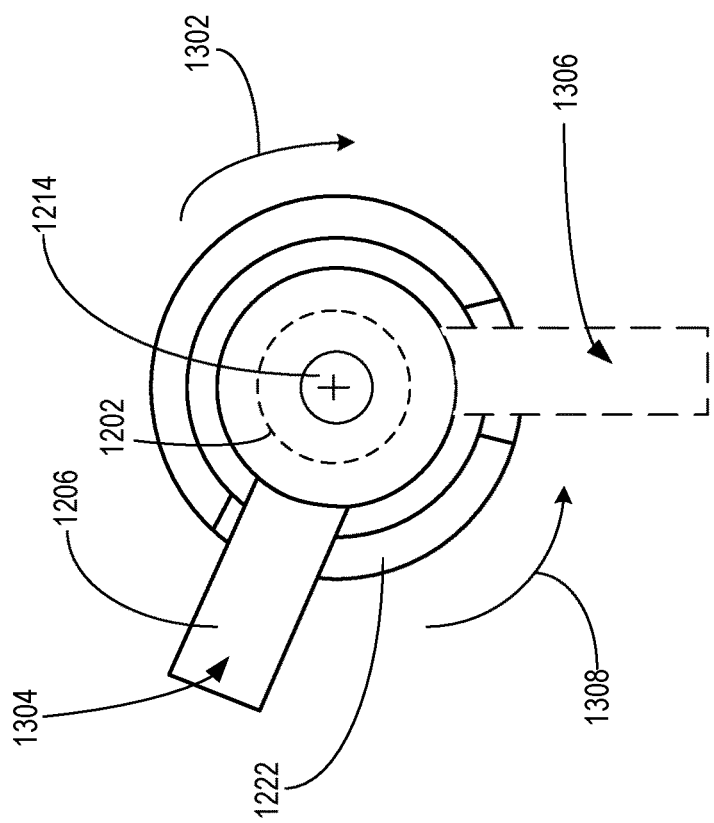
FIG. 13 shows a top plan view of the first example of a dog leg retention system in accordance with one or more second embodiments of the present disclosure.

With respect to FIGS. 12-14, these figures show different views of examples of a second dog leg retention embodiment wherein a spring may be included within the retention system such that the position of the dog leg may be maintained. The spring may additionally or alternatively cause the force exerted by the spring to push the dog leg into a home or unlocked position when the screw is removed.

In FIG. 12, an example of a second embodiment of a dog leg retention system is provided. In such an embodiment, a spring 1202 may be provided to impart one or more forces (e.g., rotational forces around a longitudinal axis of the spring and lateral forces along the longitudinal axis of the spring) onto a dog leg 1206 in order to move the dog leg 1206 into a "home" or unlocked position. The dog leg 1206 may be coupled to a head portion 1212, also referred to as a dog leg post, of the system which may further include a "dog end" spring capture groove 1208. It will be appreciated that as used herein, "dog end" may refer to an area or region most closely associated with the position of the dog leg 1206. Further, the use of the term "base end" may refer to an area or region of the retention system most closely associated with a bottom edge or a bottom hole 1218 of the retention system. The spring may be retained at a bottom edge of the retention system via a "base end" spring capture groove 1204. In this way, a home or unlocked position of the dog leg may be maintained even in the absence of a screw 1214 or other fastening device.

The spring 1202 may extend from a base end spring capture groove 1204 through a vertical channel 1216, and into a dog end spring capture groove 1208. The screw 1214 may be inserted into the bottom hole 1218 of a baffle 1210 of the retention system, may fully traverse the vertical channel 1216, and may at least partially traverse the head portion 1212 of the dog leg. In this way, manipulation and/or adjustment of the screw 1214 may result in a rotation of the dog leg into an unlocked or locked position. Additionally, upon removal, the screw 1214 may be fully removed and the dog leg may be pushed toward the home unlocked position such that the dog leg may not interfere with installation and/or removal of the architectural system.

Additionally, one or more examples may comprise a top cap 1220 as briefly described with reference to FIGS. 9 and 10. The top cap may provide an additional source of frictional retention for the screw 1214 (e.g., illustrated with a longitudinal axis 1215, which may also correspond to a longitudinal axis of the dog leg retention system). Further, in embodiments of the dog leg retention system utilizing spring forces to maintain the position of the dog leg, the system may include a cylindrical support structure 1221 which may include an angular top shelf ramp 1222. The ramp 1222 may comprise a small, angular cut in the cylindrical support structure 1221 such that the rotational force exerted by the spring 1202 may promote rotation of the dog leg 1206 into the home unlocked position. For example, when the screw 1214 is removed, the spring 1202 may push up onto the head portion 1212 of the dog leg system and may further impart a slight rotational force due to the shape and nature of the spring position. The dog leg may then follow the path of walls of the vertical channel 1216 up to a position where the top shelf ramp 1222 begins. At this point, the rotational force may then result in the rotation of the dog leg into an unlocked position.

Accordingly, in the absence of friction between the screw and the dog leg, the spring may impart a rotational force on the dog leg to rotate the dog leg back into the home position, with the added benefit of pushing the dog leg up the cylindrical support via lateral forces if the screw breaks or is removed. The shelf ramp 1222 may be used in conjunction with the spring to allow "auto rotation" of the dog leg into the cylindrical support vertical channel as the screw is tightened. Otherwise, when tightening the screw on a flat type shelf, the dog leg may not rotate or overcome the rotational force of the spring.

FIG. 13 provides a top-down plan view of the example embodiment described above with reference to FIG. 12. For example, a home unlocked position 1304 and a locked position 1306 of the dog leg 1206 are illustrated. As shown in this figure, the direction of spring rotation 1302 may be resultant from the rotational force afforded by the spring 1202 (illustrated in more detail in FIG. 12) within the dog leg retention system. For example, as a screw 1214 is rotated (e.g., in a setting direction 1308), the dog leg 1206 may be rotated about a central axis coaxial with a longitudinal axis 1215 (illustrated in FIG. 12) of the screw 1214 in the setting direction 1308 counter to the direction of spring rotation 1302 and to be moved into a locked position 1306. When the screw is removed, the spring may impart the stored forces onto the dog leg 1206 and the dog leg may then move in the direction of spring rotation 1302 and may eventually run along and up a top shelf ramp 1222 (e.g., having an incline with respect to the longitudinal axis of the screw/dog leg retention system) such that the dog leg may rest in a home position 1304. In this way, the position of the dog leg may be maintained via the retention force provided by the spring without the inclusion of screws or other fasteners.

FIG. 14 shows a cross section of a side profile view of an example of the second embodiment of the dog leg retention system illustrated in FIGS. 12 and 13. In this view, the angular nature of the top shelf ramp 1222 may be more clearly illustrated than in the views of FIGS. 12 and 13. As the dog leg 1206 moves between a locked position and an unlocked, "home" position, the dog leg may be moved along the top shelf ramp 1222 from the natural downward force imparted by rotational tightening of the screw 1214. In some examples, at least one edge or face of the dog leg (e.g., lateral face 1402 and/or edge 1403) may come into direct face-sharing contact with a portion of the top shelf ramp 1222 and/or a vertical lateral wall 1404 or 1405 of the vertical channel 1216 of the dog leg retention system (e.g., at one or more locations while transitioning between the locked and unlocked positions). For example, when a screw is removed and/or when the system is uninstalled, the dog leg 1206 may then be urged upward along a vertical wall 1405 of the vertical channel 1216 until a reaching the top shelf ramp 1222. Once the ramp 1222 is reached by the dog leg, the dog leg 1206 may then move toward vertical lateral wall 1404 into a home position and the position may be maintained by the spring forces exerted by the spring housed within the vertical channel of the retention system.

Figure 16:
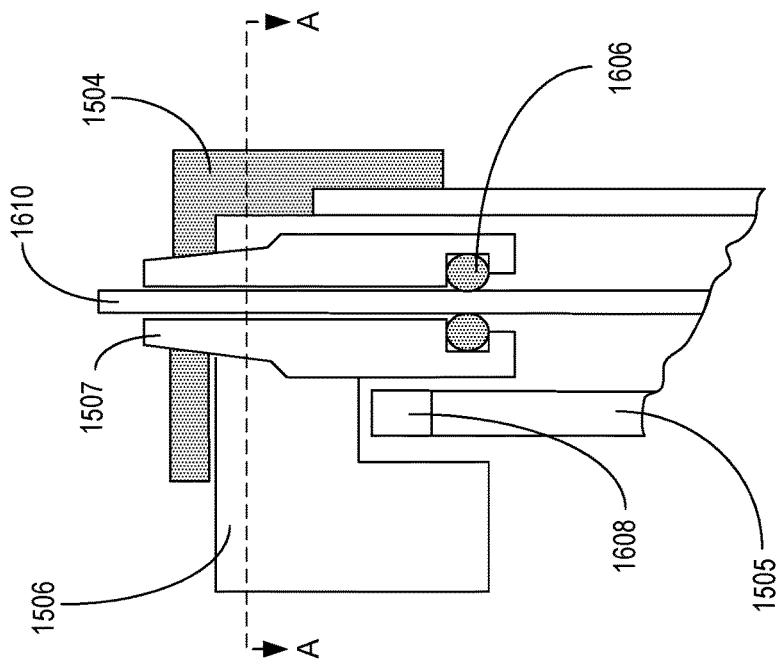
FIG. 16 shows a cross-sectional side profile view of a second example of a dog leg retention system in accordance with one or more third embodiments of the present disclosure.
Figure 15:
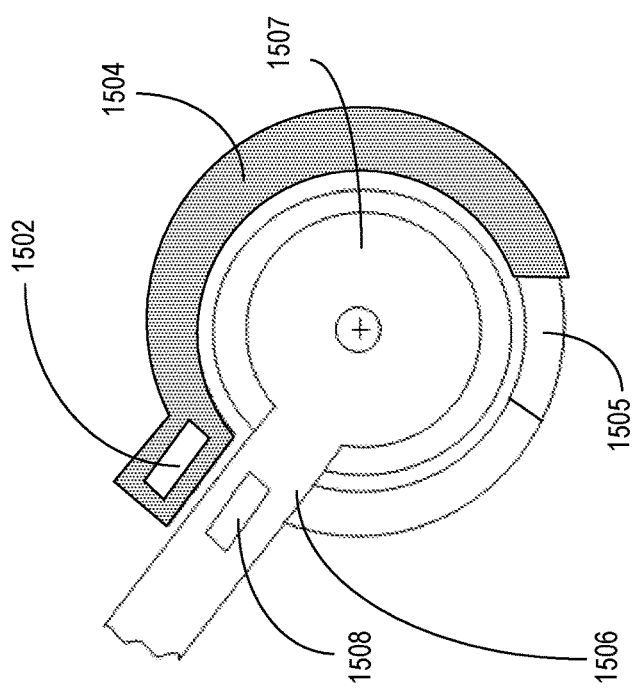
FIG. 15 illustrates a top plan view of a first example of a dog leg retention system in accordance with one or more third embodiments of the present disclosure.
Figure 17:
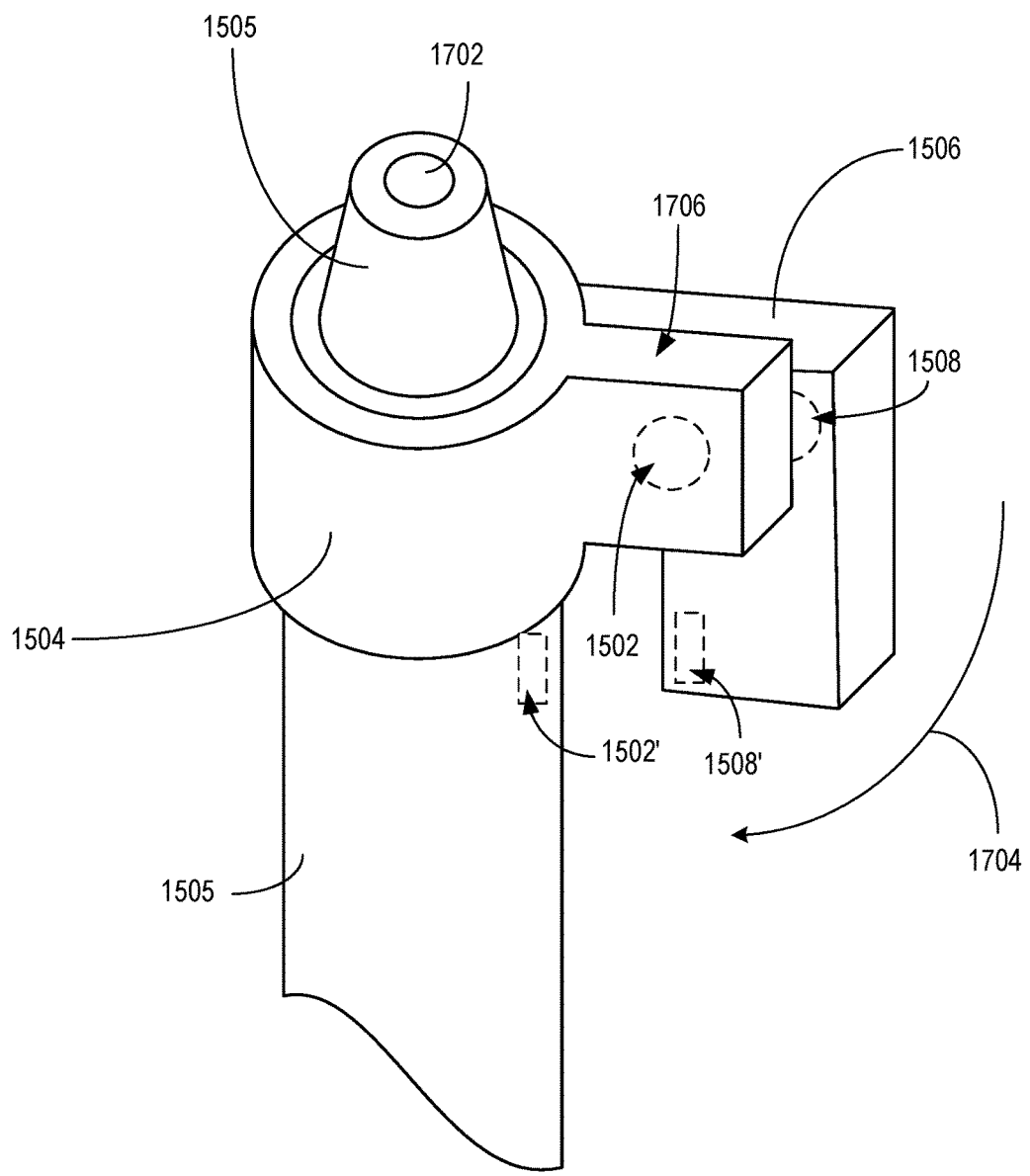
FIG. 17 shows a side isometric view of a third example of a dog leg retention system in accordance with one or more third embodiments of the present disclosure.

Turning now to FIGS. 15-17, examples of a third embodiment are provided wherein magnets may be included within a dog leg retention system to bias the system toward a home unlocked position. In FIG. 15, a top-down plan view of the third embodiment of a dog leg retention system is illustrated. In this embodiment, the function of the dog leg 1506 relative to a cylindrical support or post 1505 of the dog leg retention system may be similar to that of the second embodiment as described with respect to FIG. 13.

In the example illustrated in FIG. 15, a magnet 1502 may be disposed within an interior section of a cap 1504 or portion of a cylindrical support 1505 such that in a home or unlocked position, the dog leg 1506 (e.g., extending from a dog leg post 1507) may rest flush against and/or be pulled toward (e.g., via a magnetic force) a portion of the cap 1504. Further, the dog leg 1506 may comprise a metallic component 1508 disposed within an interior section such that the dog leg 1506 and the cap 1504 may be in direct face-sharing contact with one another at an interface between the magnet 1502 and the metallic component 1508. The metallic component 1508 of the example embodiment may comprise a magnet, captured steel, or any other magnetically active component such that the magnetic forces of the supplied magnet 1502 may retain the dog leg 1506 in a home unlocked position. In other examples, the dog leg may include the supplied magnet 1502, while the metallic component (e.g., formed of a magnet, captured steel, or other magnetically active component) 1508 is provided in place of the illustrated location of the magnet 1502 in FIG. 15. In this way, either or both of the dog leg and the associated portion of the cap/cylindrical support may include a magnet, and either or both of the dog leg and the associated portion of the cap/cylindrical support may include a magnetically attractive material (e.g., captured steel in one example), such that an attractive magnetic force is present between the dog leg and the portion of the cap/cylindrical support. In some examples, one or both of the dog leg and the associated portion of the cap/cylindrical support may be formed of a magnetically attractive material to provide the attractive magnetic force.

As shown in FIG. 16, a side view of an example of the third embodiment of a dog leg retention system is illustrated. For example, the illustrated dog leg retention system of FIG. 15 may correspond to a section view A-A through the top of the cap 1504, dog leg 1506, and dog leg post 1507 of FIG. 16. FIG. 16 optionally includes features from the first embodiment of a dog leg retention system (illustrated in FIGS. 4-11 for example), such as one or more grommets 1606. In this way, the example illustrated in FIG. 16 may include retention forces provided via both the grommets 1606 and the magnetic features described with respect to FIG. 15. The cap 1504 and the one or more grommets may provide an added level of support and/or retention when combined with the magnets in that for example, when the magnets are out of range of one another, the grommets and/or top cap may provide frictional retention in an installation or uninstallation state such that the position of the dog leg may be maintained. It will be appreciated that the grommets may alternatively be a nylon washer, a plurality of O-rings, and/or any other suitable component which may provide additional frictional retention.

Additionally, the illustrated dog leg retention system comprises a top shelf ramp 1608, which, through tightening of the screw 1214, may provide a natural means for the dog leg 1506 to break magnetic force coupling to top cap 1504 or optional cylindrical support 1505, and which, through loosening of the screw 1214, may provide a surface that may support the dog leg 1506 as the dog leg moves into a home unlocked position. Although the illustrated example shows a dog leg retention system utilizing the grommets of the first embodiment and the magnetic components of the third embodiment, it is to be understood that any combination of the retention mechanisms described in the disclosure may be combined to provide multiple sources of retention force (e.g., to bias or maintain the dog leg in a home position absent movement of the screw). For example, a dog leg retention system according to the present disclosure may include any of the frictional components described with respect to FIGS. 4-11, any of the spring components described with respect to FIGS. 12-14, and/or any of the magnetic components described with respect to FIGS. 14-17.

In FIG. 17, an isometric view of the third embodiment of a dog leg retention system which utilizes magnetic attractive forces to retain a position of the dog leg is provided. In this view, the dog leg 1506 may be in direct face-sharing contact with the cap 1504. The screw 1610 (not shown in FIG. 17 for clarity purposes) may be further secured and/or retained by the dog leg system by traversing the cap 1504, which may comprise a nylon or rubber material, and through opening 1702. The cap 1504 and/or the cylindrical support 1505 may further provide frictional forces to the screw in order to retain the screw within the system assembly.

The dog leg 1506 may move in a direction 1704 toward an arm 1706 of the cap 1504. The cap 1504 (e.g., the arm 1706 of the cap) may further include the magnet 1502 housed within an interior section. The dog leg 1506 may include the metallic element 1508 (which may include a magnet in some examples) that is magnetically attracted to magnet 1502. In this way, the position of the dog leg in an unlocked position may be maintained via the use of magnets and/or magnetic components. Magnet 1502' and metallic element 1508' illustrate example alternative positions of magnet 1502 and metallic element 1508, respectively, where the magnetic forces are provided between the dog leg 1506 and the cylindrical support 1505, rather than between the dog leg and the cap 1504. Other magnetic arrangements may be provided to retain the dog leg in the home position in other examples. Further, as described above, one or each of the dog leg, cylindrical support, and cap may include and/or be composed of a magnetically-attractive material, rather than including a separate magnetically-attractive element. For example, the dog leg 1506 may be composed of a magnetically-attractive material (e.g., steel) and the cap and/or cylindrical support may include magnet 1502 and/or 1502'. In another example, the cap and/or cylindrical support may be composed of a magnetically-attractive material (e.g., steel) and the dog leg may include a magnet in the place of metallic element 1508.

Figure 18A:
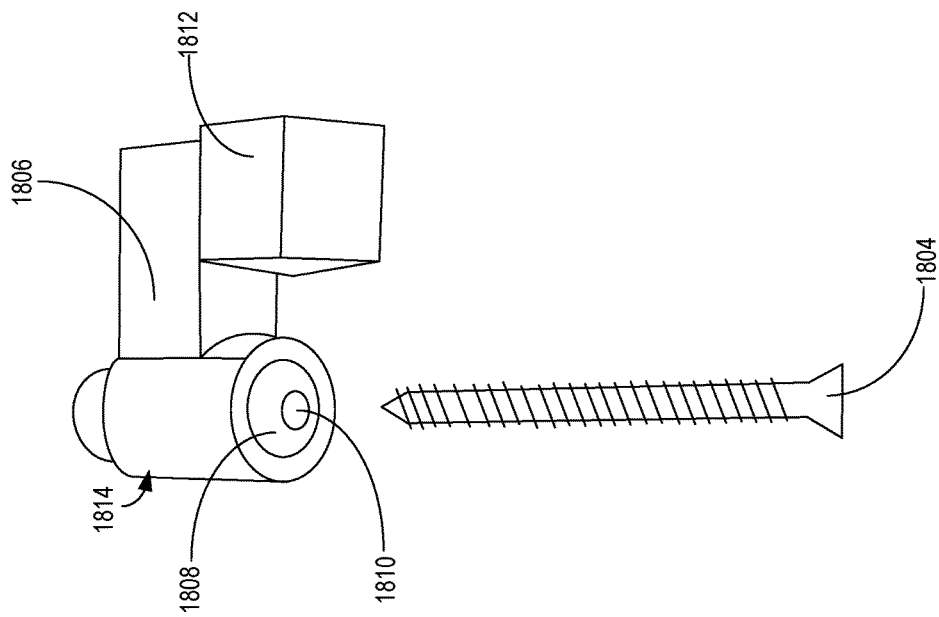
FIGS. 18A and 18B show example dog leg retention systems and types of fastening elements in accordance with one or more embodiments of the present disclosure.
Figure 18B:
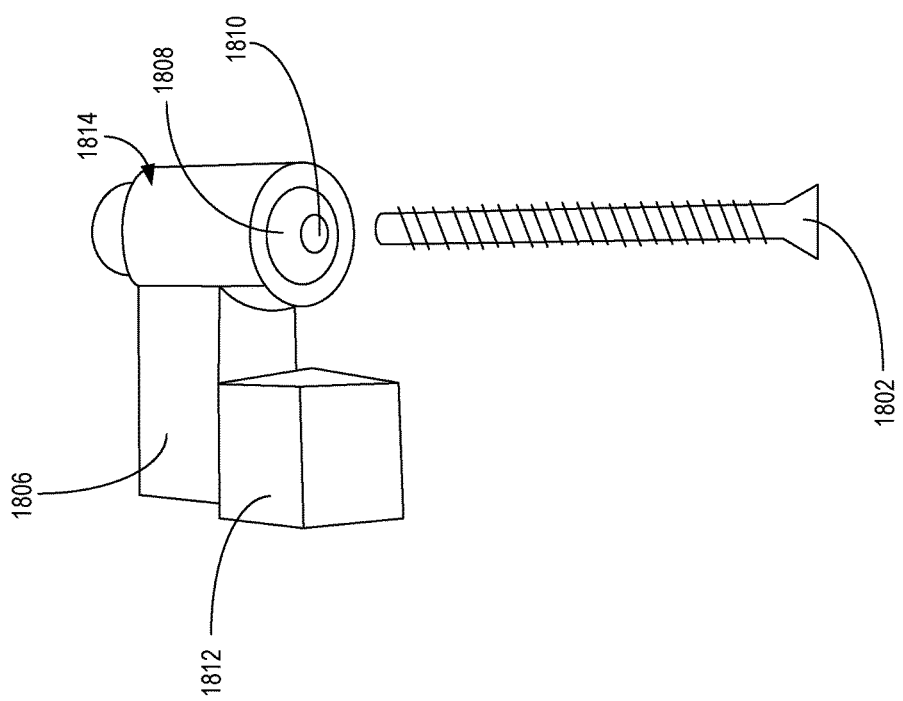

As provided in FIGS. 18A and 18B, a plurality of fasteners and/or a plurality of types of fasteners may be used with the example dog leg retention system embodiments disclosed herein. For example, machine type screws 1802 (FIG. 18A) and/or self-tapping screws 1804 (FIG. 18B) may be used to position a dog leg 1806. Further, the dog leg 1806 may comprise a grommet 1808 including a hole 1810 such that the position of the dog leg may be adjusted via direct manipulation and/or adjustment of the screw 1802/1804 passing through hole 1810.

Further, as shown in FIGS. 18A and 18B, example dog leg retention systems may comprise a secondary dog leg structure 1812 which may enhance the size and effective operational area of the dog leg. For example, a dog leg 1806 may be fixedly coupled to a secondary dog leg structure 1812 which may be wider than the profile of the dog leg 1806 and which may extend beyond a bottom edge of a cylindrical support structure 1814. In this way, the adaptability and applicability of the dog leg retention system may be increased relative to other mounting systems.

Figure 19:
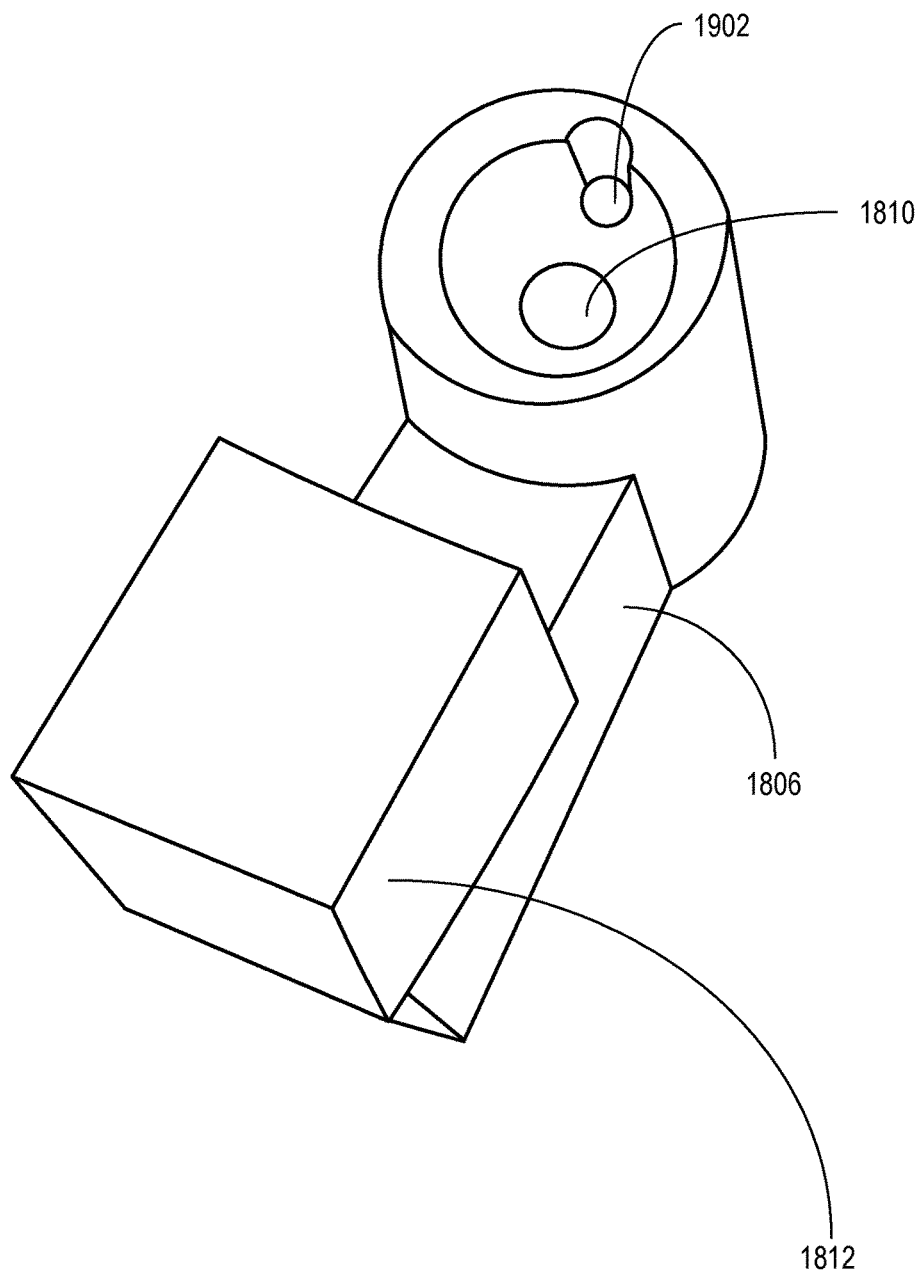
FIG. 19 shows an isometric view of a bottom surface of a dog leg for use with example dog leg retention systems in accordance with one or more embodiments of the present disclosure.

FIG. 19 shows a bottom isometric view of the example provided in FIGS. 18A and 18B. In this figure, the relationship of the secondary dog leg structure 1812 with the dog leg 1806 is shown. Additionally, a top spring capture groove 1902 is also visible. It will be appreciated that various combinations of the embodiments and the components of such embodiments may be provided. For example, combinations of springs, magnets, and/or frictional retention methods may be incorporated into various example embodiments such that the retention force supplied by the overall dog leg retention system may be adjusted.

Figure 20:
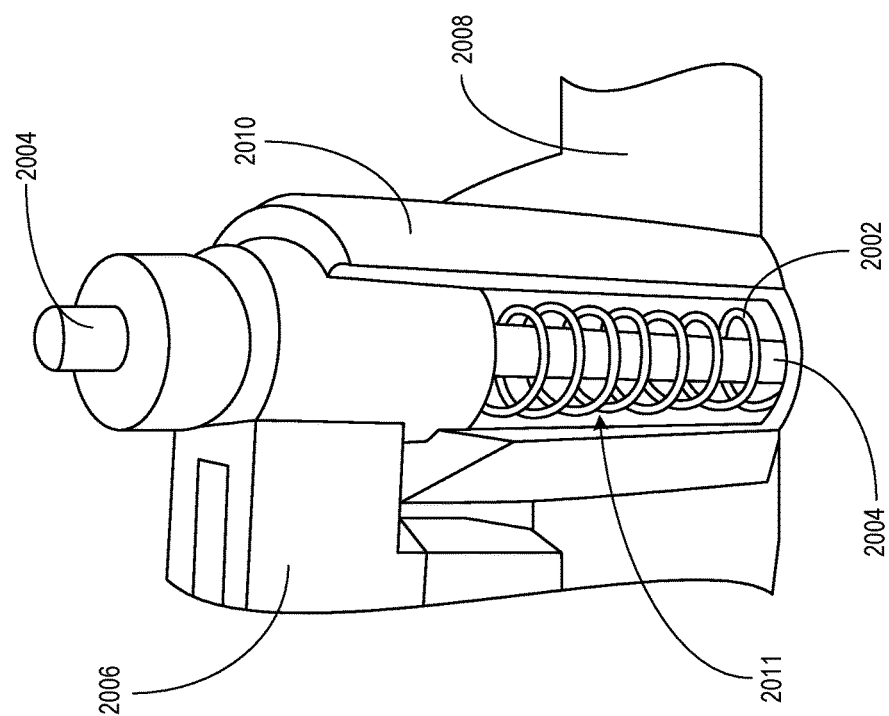
FIG. 20 shows an example of a cantilevered retention system in an unlocked position in accordance with one or more embodiments of the present disclosure.

Turning now to FIG. 20, this figure illustrates a side cut-away view of an example dog leg retention system that is included on an example architectural system in an unlocked position. A cylindrical support structure 2010 serves as a housing which may guide the movement of the dog leg 2006 upward and downward based on the forces exerted by a screw 2004 and/or a spring 2002. As the dog leg 2006 moves into a locked position, the dog leg may rotate toward the open portion 2011 of the cylindrical support 2010 and down toward the architectural component 2008.

Figure 21:
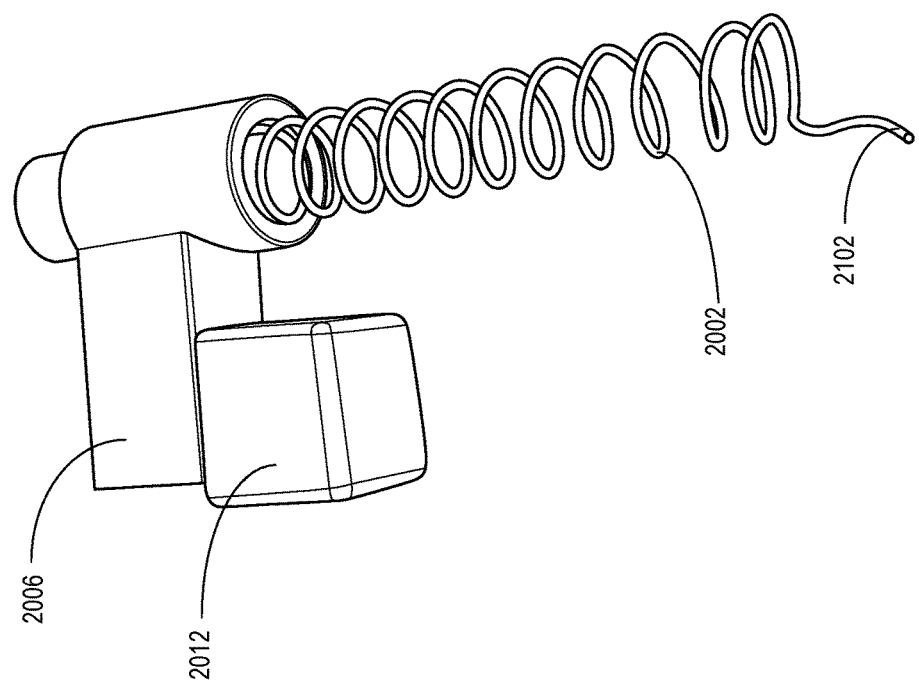
FIG. 21 shows an isometric view of a cantilever with an internally disposed spring in accordance with one or more embodiments of the present disclosure.

In FIG. 21, an isometric view of portions of the example dog leg for use with a dog leg retention system as illustrated by FIG. 20 is provided. In this figure, the dog leg 2006 is shown separately from the cylindrical support structure so that the spring 2002 and a secondary dog leg structure 2012 may be visible. As illustrated in FIG. 21, the dog leg 2006 may comprise a secondary dog leg structure 2012 which may serve in at least one example, to provide additional height and/or width to the dog leg which may further result in increased retention due to improved clamping or pinching by the secondary dog leg structure onto a mounting surface. For example, when mounting an architectural system into a wall or ceiling surface, the thickness of the drywall may not be adequately thick such that the dog leg may fully pinch the drywall surface when in a locked position. The addition of a secondary dog leg structure however, may account for the lack of drywall thickness and may allow for retention of the system similar to a case in which the drywall is sufficiently thick such that the dog leg 2006 itself may clamp and sufficiently retain the system.

Figure 22:
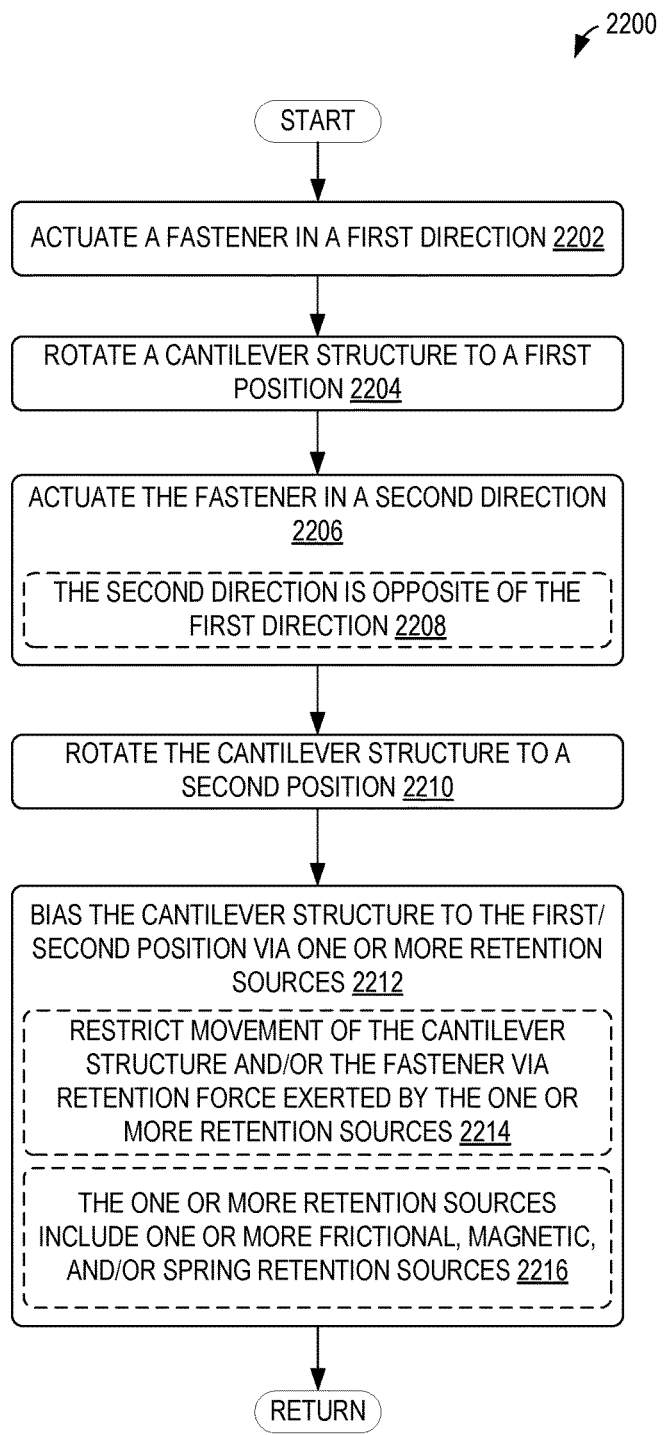
FIG. 22 is a flow chart of a method of retaining a position of a cantilevered structure of a cantilevered retention system in accordance with one or more embodiments of the present disclosure.

FIG. 22 is a flow chart for a method 2200 of retaining a position of a cantilevered structure of a cantilevered retention system. For example, method 2200 may be performed by one or more components of any of the above-described cantilevered retention systems/dog leg retention systems of FIGS. 1-21. At 2202, the method includes actuating a fastener in a first direction. For example, a fastener such as a screw may be actuated to traverse through a threaded channel. The threaded channel may be coupled to and/or form a portion of a cantilever structure (e.g., a dog leg, such as dog leg 406 of FIG. 4 in one non-limiting example, or any of the other dog leg/cantilever structures described herein). Accordingly, actuation of the fastener may cause the cantilever structure to rotate. At 2204, the method includes rotating (e.g., via the actuation of the fastener) a cantilever structure to a first position. For example, the first position may include either of the locked or unlocked (e.g., "home") positions described above (e.g., with respect to FIGS. 1 and 2).

At 2206, the method includes actuating the fastener in a second direction. The second direction may be opposite of the first direction, as indicated at 2208. At 2210, the method includes rotating the cantilever structure to a second position. For example, the second position may include the other of the locked or unlocked (e.g., "home") position described above. In one example, if the first position corresponds to the locked position, the second position may correspond to the unlocked/home position. In another example, if the first position corresponds to the unlocked/home position, the second position may correspond to the locked position.

At 2212, the method includes biasing the cantilever structure to the first or second position (e.g., bias the cantilever structure to be maintained at or urged toward the first or second position, or otherwise provide a biasing force that is to be overcome in order to move the cantilever structure away from the position to which the cantilever structure is biased) via one or more retention sources. For example, the one or more retention sources may restrict movement of the cantilever structure and/or the fastener via retention forces exerted on the cantilever structure and/or fastener, as indicated at 2214. As indicated at 2216, the one or more retention sources may include any one or combination of frictional (e.g., as described above with respect to FIGS. 4-11), magnetic (e.g., as described above with respect to FIGS. 15-17), and/or spring (e.g., as described above with respect to FIGS. 12-14) retention sources.

As one example, a dog leg retention system for wall or ceiling mounting architectural systems such as speakers for example, may comprise a cylindrical support structure, a dog leg comprising a threaded channel and an L-shaped hook structure movably coupled to the cylindrical support structure; one or more frictional retention sources; and a fastener which traverses the cylindrical support structure at least partially traverses the dog leg and the one or more frictional retention sources may be provided. As a further example, an embodiment may be provided which may optionally include the first example and may further comprise rubber O-rings or nylon washers as the one or more sources of frictional retention.

As another example, a dog leg retention system may comprise any of the first and second examples and may optionally include a fastener which comprises a screw. Additionally, another example may comprise any of the first through third examples, and may optionally comprise a combination of rubber O-rings and nylon washers as the one or more sources of frictional retention.

As one example, a second embodiment of the system disclosed herein may comprise a system for mounting architectural components onto a wall or ceiling comprising a cylindrical support further comprising a shelf ramp, a dog leg comprising an L-shaped hook movably coupled to the cylindrical support, a spring disposed within an internal area of the cylindrical support, wherein the spring pushes the dog leg up the shelf ramp and into an unlocked home position, and a fastener positioned within the spring which at least partially traverses the dog leg. A second example may include the first example and optionally may further comprise at least one source of frictional retention. A third example may include any of the first and second examples and may further comprise one or more rubber O-rings as a source of frictional retention. A fourth example may optionally include any of the first through third examples and may further comprise one or more nylon washers as a source of frictional retention. A fifth example of the second embodiment may optionally include any of the first through fourth examples and may further comprise a nylon or rubber cap as a source of frictional retention. A sixth example may optionally comprise any of the first through fifth examples and may further comprise a screw as the fastener. Another example may optionally include any of the first through sixth examples and may further comprise a home position which may be maintained by the spring by forcing the dog leg up the cylindrical support and along the shelf ramp of the cylindrical support.

A third embodiment of the dog leg retention system as disclosed herein may comprise an architectural mounting system for mounting components onto a wall or ceiling which may further comprise a cylindrical support comprising a shelf ramp, a dog leg comprising an L-shaped hook movably coupled to the cylindrical support, wherein the dog leg is configured to move along the shelf ramp of the cylindrical support into a home position, a cap releasably coupled to the cylindrical support, a magnet disposed within an internal area of the cap, one or more sources of frictional retention, and a fastener coupling the dog leg to the cylindrical support. A second example may optionally include the first example and may further include wherein the dog leg further comprises a magnetically active component disposed within an internal area of the dog leg. A third example may optionally include any of the first and second examples and may further comprise wherein the cap comprises a source of frictional retention. A fourth example may optionally include any of the first through third examples and may further comprise rubber O-rings or grommets as the one or more sources of frictional retention. A fifth example may optionally include any of the first through fourth examples and may further comprise nylon washers as the one or more sources of frictional retention. Another example may optionally include any of the first through fifth examples and may further include a cap which selectively retains the magnetically active component in the dog leg via magnetic attractive forces.

The disclosure also provides for a method of retaining a position of a cantilevered mounting structure including a support structure, a cantilever structure, and one or more retention sources, the method including actuating a fastener in a first direction, the fastener traversing the support structure and at least partially traversing the cantilever structure and the one or more retention sources, rotating the cantilever structure to a first position responsive to the actuation of the fastener in the first direction, actuating the fastener in a second direction, rotating the cantilever structure to a second position responsive to the actuation of the fastener in the second direction, and biasing the cantilever structure to remain in one or more of the first and the second position by restricting movement of one or more of the fastener and the cantilever structure based on retention force exerted by the one or more retention sources on the fastener and/or the cantilever structure. In a first example of the method, the support structure may include a cylindrical support including a shelf ramp, the cantilever structure may include a dog leg movable coupled to the cylindrical support, and rotating the cantilever structure to one or more of the first and the second position may include moving the dog leg along the cylindrical support into one or more of the first and the second position, respectively. A second example of the method optionally includes the first example, and further includes the method, wherein the cantilevered mounting structure further includes a cap releasably coupled to the cylindrical support and a magnet disposed within an interior area of the cap, the method further including selectively retaining a magnetically active component disposed within an internal area of the dog leg via magnetic attractive forces. A third example of the method optionally includes one or both of the first and the second examples, and further includes the method, wherein the one or more retention sources include at least a spring retention source, the method further including maintaining one or more of the first position and the second position by forcing the dog leg up the cylindrical support and along the shelf ramp of the cylindrical support via the spring retention source. A fourth example of the method optionally includes one or more of the first through the third examples, and further includes the method, wherein the second direction is opposite the first direction. A fifth example of the method optionally includes one or more of the first through the fourth examples, and further includes the method, wherein restricting movement of one or more of the fastener and the cantilever structure comprises restricting movement of the one or more of the fastener and the cantilever structure based on retention force exerted by one or more rubber O-rings, grommets, and nylon washers on the fastener and/or the cantilever structure.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the dog leg 306 described with reference to FIG. 3. The described methods and associated actions may also be performed in various orders in addition to the order described in this application, in parallel, and/or simultaneously. The described systems are exemplary in nature, and may include additional elements and/or omit elements. Furthermore, relative dimensions of components in the figures illustrating the described systems are exemplary in nature, and components having different relative dimension may be included in the example systems without departing from the scope of the disclosure. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, are also regarded as included within the subject matter of the present disclosure.

The invention claimed is:

1. A cantilevered retention system for mounting to a surface, the cantilevered retention system comprising:
   a cylindrical support structure;
   a cantilever structure comprising a dog leg, the dog leg comprising an L-shaped hook structure;
   a retention source configured to bias the cantilever structure to be maintained at a first position, where the retention source is a spring, the cantilever structure being moveable between the first position and a second position via a fastener that traverses the cylindrical support structure and at least partially traverses the cantilever structure and the retention source, the cylindrical support structure positioned between the fastener and the L-shaped hook structure, wherein the fastener is a screw, and wherein the spring is positioned between a head of the screw and the dog leg,
   wherein the cylindrical support structure extends between a baffle and the L-shaped hook structure; and
   a first spring capture groove formed into the baffle and a second spring capture groove formed into a head portion of the dog leg, the first spring capture groove and the second spring capture groove extending in a direction parallel to a longitudinal axis of the screw.

2. The cantilevered retention system of claim 1, further comprising a cap disposed at least partially around a periphery of the cantilever structure.

3. The cantilevered retention system of claim 2, wherein the L-shaped hook structure is rotatably mounted atop the support structure, and further comprising one or more magnetic elements disposed in one or more of the cantilever structure, the cap, and the support structure.

4. The cantilevered retention system of claim 1, further comprising one or more frictional retention sources disposed around a threaded channel of the cantilever structure.

5. The cantilevered retention system of claim 1, wherein the spring is disposed around the screw.

6. The cantilevered retention system of claim 5, wherein the cantilever structure further comprises a dog leg post, the L-shaped hook structure extending from the dog leg post.

7. The cantilevered retention system of claim 6, wherein the spring is coupled to the dog leg post at a first end of the spring and to the baffle at a second end of the spring, the first end of the spring being opposite of the second end of the spring.

8. The cantilevered retention system of claim 1, wherein the L-shaped hook structure rests atop the cylindrical support structure in an unlocked position.

9. A system for mounting architectural components onto a wall or ceiling comprising:
   a cylindrical support comprising a shelf ramp;
   a dog leg comprising an L-shaped hook movably coupled to the cylindrical support;
   a spring disposed within an internal area of the cylindrical support, wherein the spring pushes the dog leg up the shelf ramp and into an unlocked home position;
   a fastener positioned within the spring which at least partially traverses the dog leg, wherein the fastener is a screw, wherein the spring is positioned between a head of the screw and the dog leg, and wherein the shelf ramp is positioned between the head of the screw and the dog leg, the shelf ramp further overlapping with and contacting the L-shaped hook,
wherein the cylindrical support extends between a baffle and the L-shaped hook; and
a first spring capture groove formed into the baffle and a second spring capture groove formed into a head portion of the dog leg, the first spring capture groove and the second spring capture groove extending in a direction parallel to a longitudinal axis of the screw.

10. The system of claim 9, wherein the system further comprises at least one source of frictional retention.

11. The system of claim 10, wherein the at least one source of frictional retention comprises a nylon or rubber cap.

12. The system of claim 9, wherein the unlocked home position is maintained by the spring forcing the dog leg up the cylindrical support and along the shelf ramp of the cylindrical support.

13. A method of retaining a position of a cantilevered mounting structure including a support structure, a cantilever structure, and a retention source, the method comprising:
actuating a fastener in a first direction, the fastener traversing the support structure and at least partially traversing the cantilever structure and the retention source, wherein the fastener is a screw, and wherein the retention source is a spring;
rotating the cantilever structure to a first position responsive to the actuation of the fastener in the first direction;
actuating the fastener in a second direction;
rotating the cantilever structure to a second position responsive to the actuation of the fastener in the second direction; and
biasing the cantilever structure to remain in one or more of the first position and the second position by restricting movement of one or more of the fastener and the cantilever structure based on a retention force exerted by the retention source on the fastener and/or the cantilever structure,
wherein the cantilever structure comprises a dog leg and a cylindrical support, the dog leg comprising an L-shaped hook structure and the cylindrical support including a shelf ramp, wherein the shelf ramp overlaps the L-shaped hook structure and is in contact with the L-shaped hook structure,
wherein the spring is positioned between a head of the screw and the dog leg,
wherein the shelf ramp is positioned between the head of the screw and the dog leg,
wherein the cylindrical support is positioned between the screw and the L-shaped hook structure,
wherein the cylindrical support extends between a baffle and the L-shaped hook structure, and
wherein a first spring capture groove is formed into the baffle and a second spring capture groove is formed into a head portion of the dog leg, the first spring capture groove and the second spring capture groove extending in a direction parallel to a longitudinal axis of the screw.

14. The method of claim 13, wherein the dog leg is movable and coupled to the cylindrical support, and wherein rotating the cantilever structure to one or more of the first position and the second position includes moving the dog leg along the cylindrical support into one or more of the first position and the second position, respectively.

15. The method of claim 14, wherein the cantilevered mounting structure further includes a cap releasably coupled to the cylindrical support and a magnet disposed within an interior area of the cap, the method further comprising selectively retaining a magnetically active component disposed within an internal area of the dog leg via magnetic attractive forces.

16. The method of claim 14, the method further comprising maintaining one or more of the first position and the second position by forcing the dog leg up the cylindrical support and along the shelf ramp of the cylindrical support via the spring.

17. The method of claim 13, wherein the second direction is opposite the first direction.

* * * * *